Patented Oct. 29, 1940

2,219,416

UNITED STATES PATENT OFFICE 2,219,416

COMPOUND FOR TREATING WATER IN BOILERS

Dudley K. French, Winnetka, Ill., assignor to The Dole Valve Company, Chicago, Ill., a corporation of Illinois No Drawing. Application August 7, 1936, Serial No. 94,795

8 Claims. (Cl. 210—23)

This invention relates to a compound for use in treating waters in boilers. In this compound I use caustic soda and a phosphate, such, for example, as a sodium phosphate. The materials when used are mixed together and placed in packages and sold to the users. The compound may remain on the shelf for a considerable length of time and it is essential for this purpose that the two materials remain stable while thus packed, and that there be no chemical change in them. It is not practicable to combine caustic soda with the commercial phosphates on the market because of the water of crystallization in the phosphates which the caustic soda takes away from the phosphate and in which it is dissolved, and the compound is thereby converted into a mushy mass, which when let stand, becomes a hard cake or lump. The present invention has as one of its objects to provide a compound of these materials wherein the materials are in a more or less finely divided dry state and when mixed and put into a container, will remain in this more or less finely divided state until the mixture is used in the boiler.

In carrying out the invention, I use caustic soda in a more or less finely divided dry state, as for example in a granulated form, or flaked form, or small lump form, and I mix with it an anhydrous phosphate, such as anhydrous di or tri phosphate of sodium. I have found that good results are secured by using the materials in the proportions of 70 percent caustic soda and 30 percent of the anhydrous phosphate. I may, however, change these proportions and I may use from 20 percent to 80 percent of either or both of the materials.

The materials in this more or less finely divided form are placed in a suitable container, such as a can, there being in each container preferably just the proper amount to be used at one time in the boiler. This amount of course will depend upon the conditions presented and the size of the boiler. I have found that with an ordinary boiler of around 500 feet capacity that about ⅜ of a pound of the compound is sufficient. As before stated, the compound is placed in containers, such as cans, and will keep indefinitely as a stable compound, the material remaining in dry condition so that when used, it is only necessary to open the container and deposit the material in the boiler.

When these materials are mixed and placed in sealed containers, they remain therein without any reaction occurring and the mixture is as stable as either one of the constituents.

I claim:

1. A preparation for treating water in boilers which consists of caustic soda and an anhydrous alkaline phosphate, placed in a sealed container, the preparation remaining as a stable dry preparation while in the container.

2. A preparation for treating water in boilers which consists of 70 percent caustic soda and 30 percent of an anhydrous alkaline phosphate, placed in a sealed container of considerable size and in substantial quantities to fill such container, the preparation remaining as a stable dry preparation while in the container.

3. A preparation for treating water in boilers which consists of from 20 percent to 80 percent caustic soda and from 20 percent to 80 percent of an anhydrous alkaline phosphate, placed in a sealed container, the preparation remaining as a stable dry preparation while in the container.

4. A preparation for treating water in boilers which consists of caustic soda and an anhydrous alkaline phosphate, both in a divided condition, mixed together, and placed in a sealed container of considerable size and in substantial quantities to fill such container, the preparation remaining as a stable dry preparation while in the container.

5. A preparation for treating water in boilers which consists of 70 percent caustic soda and 30 percent anhydrous alkaline tri-sodium phosphate, both in a divided state, mixed together, and placed in a sealed container, the preparation remaining as a stable dry preparation while in the container.

6. A preparation for treating water in boilers which consists of from 20 percent to 80 percent caustic soda and from 20 percent to 80 percent of anhydrous alkaline tri-sodium phosphate, both in a divided state, mixed together, and placed in a sealed container, the preparation remaining as a stable dry preparation while in the container.

7. A preparation for treating water in boilers which consists of caustic soda and an anhydrous alkaline phosphate in a dry state, both in a divided condition and mixed together, and means for preventing chemical action between the caustic soda and anhydrous alkaline phosphate to prevent a chemical change in the mixture before the mixture is ready for use in the boilers, whereby the mixed materials may be distributed to the users and kept by them until ready to be put into the boilers.

8. A preparation for treating water in boilers which consists of caustic soda and an anhydrous alkaline phosphate in a dry state both in substantial quantities to fully act on the water in the boiler, both in a divided condition and mixed together, and means for preventing chemical action between the caustic soda and anhydrous alkaline phosphate to prevent a chemical change in the mixture and for preventing water from being absorbed by the caustic soda, before the mixture is ready for use in the boilers, whereby the mixed materials may be distributed to the users and kept by them until ready to be put into the boilers.

DUDLEY K. FRENCH.